US008434698B1

(12) United States Patent
Garcia et al.

(10) Patent No.: US 8,434,698 B1
(45) Date of Patent: May 7, 2013

(54) UNDERGROUND CHEMICAL MIXING DISPENSING SYSTEM

(76) Inventors: Jorge Garcia, Fort Worth, TX (US);
Ernest Medina, Fort Worth, TX (US);
Tony Rodriguez, Fort Worth, TX (US)

( * ) Notice: Subject to any disclaimer, the term of this patent is extended or adjusted under 35 U.S.C. 154(b) by 0 days.

(21) Appl. No.: 13/277,870

(22) Filed: Oct. 20, 2011

(51) Int. Cl.
*A62C 13/62* (2006.01)
*B05B 7/26* (2006.01)
*B05B 15/06* (2006.01)

(52) U.S. Cl.
USPC ............................ 239/310; 239/200; 239/201

(58) Field of Classification Search .................. 239/302, 239/310, 398–434.5, 200, 201, 203, 204, 239/205, 206, 207
See application file for complete search history.

(56) References Cited

U.S. PATENT DOCUMENTS

| | | | |
|---|---|---|---|
| 1,079,721 A * | 11/1913 | Pungs ........................ | 137/205.5 |
| 3,260,464 A | 7/1966 | Harant | |
| 3,833,177 A * | 9/1974 | Pasley et al. .................. | 239/201 |
| 4,340,078 A | 7/1982 | Pasley | |
| 4,456,176 A * | 6/1984 | Agius ........................... | 239/142 |
| 4,971,248 A | 11/1990 | Marino | |
| 5,150,840 A | 9/1992 | Grynkiewicz | |
| 5,364,030 A * | 11/1994 | Murdock et al. .............. | 239/310 |
| 5,366,159 A * | 11/1994 | Childers ....................... | 239/310 |
| D355,019 S | 1/1995 | Spanke | |
| 5,806,769 A | 9/1998 | Womack | |
| 6,648,243 B1 * | 11/2003 | Kastner ......................... | 239/310 |
| 7,207,503 B1 | 4/2007 | Stengel et al. | |
| 2007/0235561 A1 * | 10/2007 | Nausid .......................... | 239/310 |

\* cited by examiner

*Primary Examiner* — Len Tran
*Assistant Examiner* — Justin Jonaitis

(57) ABSTRACT

An underground sprinkler system including a tank having an inner cavity adapted to hold chemicals, a distribution pipe fluidly connected to the inner cavity of the tank allowing chemicals to be added to the tank; a mixer connector pipe fluidly connected to the inner cavity of the tank and to a water source hose; a pump disposed in the tank for pumping the chemicals out of the inner cavity of the tank and into the water source hose via the mixer connector pipe; and a secondary connector pipe fluidly connected to the inner cavity of the tank and to the water source hose, the secondary connector pipe allows water from the water source hose to enter into the inner cavity of the tank.

1 Claim, 3 Drawing Sheets

UNDERGROUND CHEMICAL MIXING DISPENSING SYSTEM

FIELD OF THE INVENTION

The present invention is directed to an accessory for water systems and sprinkler systems for adding chemicals to the water.

BACKGROUND OF THE INVENTION

The underground sprinkler system of the present invention provides for a more convenient and time saving way of watering and caring for a lawn or garden by mixing needed chemicals with the water.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
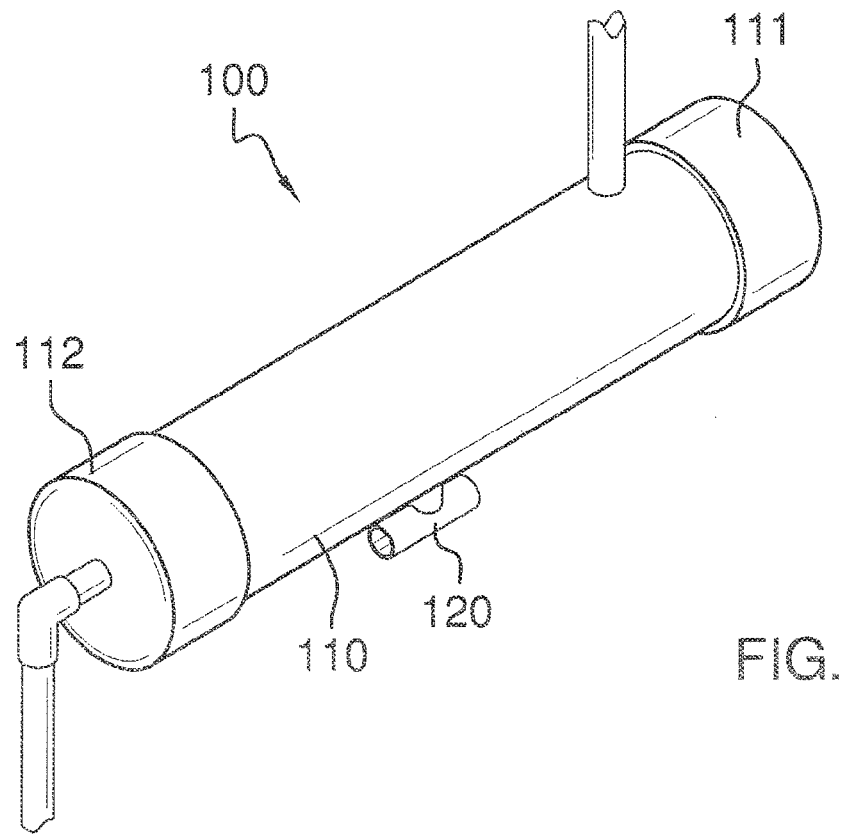
FIG. 1 is a perspective view of the system of the present invention.
Figure 2:
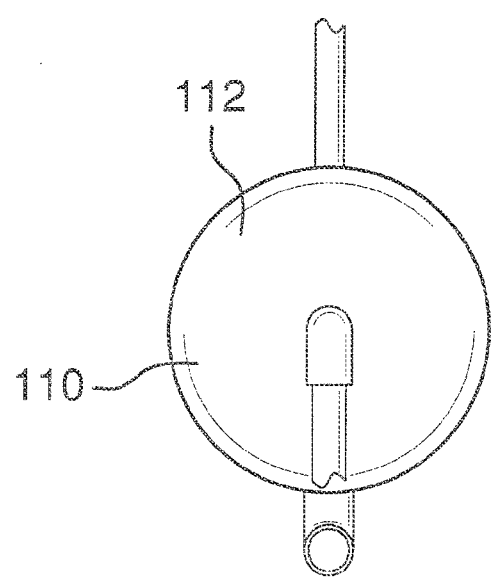
FIG. 2 is a side view of the system of the present invention.

Referring now to FIGS. 1-5, the present invention features an underground sprinkler system 100. The system 100 of the present invention helps add chemicals to water before it is dispersed (e.g., into a yard), for example via a sprinkler 170.

The system 100 of the present invention comprises a tank 110 having a first end 111, a second end 112, and an inner cavity 113 (e.g., a mixing chamber). The inner cavity 113 is adapted to hold chemicals (e.g., fertilizers, etc.). A distribution pipe 150 is fluidly connected to the inner cavity 113 of the tank 110 (e.g., the top of the tank 110). The distribution pipe 150 allows chemicals to be into the inner cavity 113 of the tank 110.

The system 100 further comprises a mixer connector pipe 130 fluidly connected to the inner cavity 113 of the tank 110 (e.g., the second end 112 as shown in FIG. 1). The mixer connector pipe 130 fluidly connects to a water source hose 101. A pump 140 is disposed inside the tank 110 (e.g., in the inner cavity 113). The pump 140 functions to pump contents of the inner cavity 113 (e.g., chemicals, water) out of the tank 110 (e.g., the inner cavity 113) and into the water source hose 101 via the mixer connector pipe 130.

Figure 3:
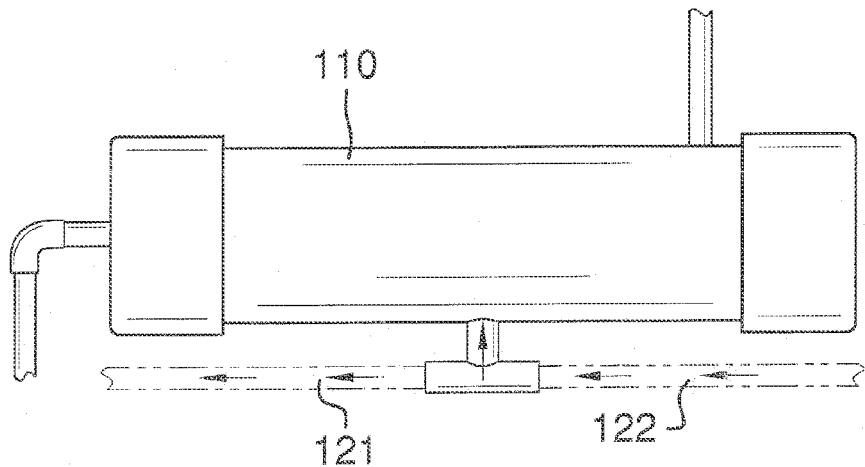
FIG. 3 is a top view of the system of the present invention.
Figure 4:
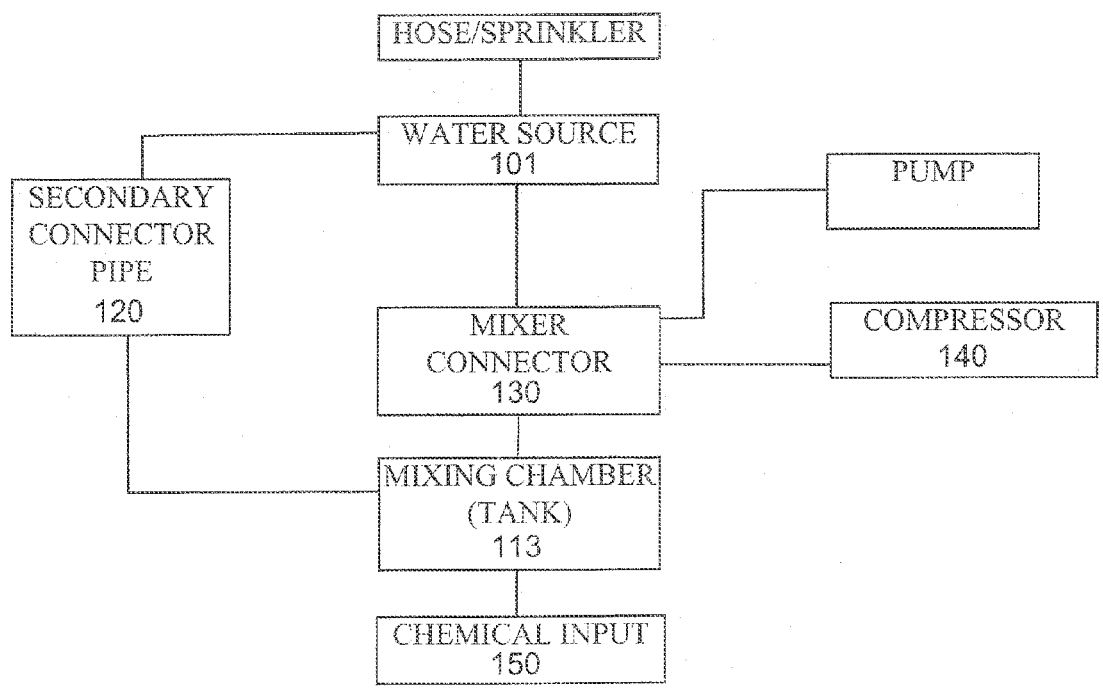
FIG. 4 is a schematic representation of the system of the present invention.

The system 100 further comprises a secondary connector pipe 120 fluidly connected to the inner cavity 113 of the tank 110. In some embodiments, the secondary connector pipe 120 extends outwardly from the tank 110 (e.g., the bottom area of the tank 110). The secondary connector pipe fluidly connects to the water source hose 101 and allows water from the water source hose 101 to enter into the inner cavity 113 of the tank 110. For example, as shown in FIG. 3, water from an incoming flow 122 passes through the secondary connector pipe 120. A portion of the water enters the tank 110; an outgoing flow 121 continues through the water source hose 101.

Figure 5:
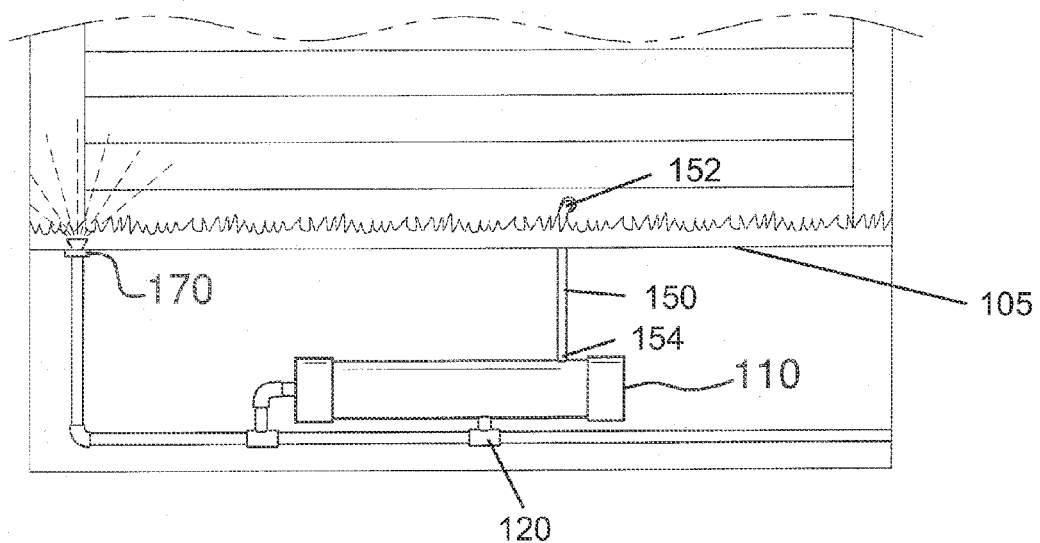
FIG. 5 is an in-use view of the system of the present invention.

As shown in FIG. 5, in some embodiments, the tank 110 is stored underground under a ground surface 105. The distribution pipe (150) has a first end (152) disposed above the ground surface for chemical receiving and a second end (154) connected to the tank (110). The sprinkler (170) is fluidly connected to the connector pipe (120) and disposed above the ground surface (105) for water dispersing.

In some embodiments, a compressor is operatively connected to the tank 110. In some embodiments, one or more foot support components are disposed on the tank 110 (e.g., on a bottom surface) for providing support.

The tank 110 may be constructed in a variety of sizes. For example, in some embodiments, the tank 110 is between about 6 to 12 inches in length (as measured from the first end 111 to the second end 112). In some embodiments, the tank 110 is between about 12 to 24 inches in length (as measured from the first end 111 to the second end 112). In some embodiments, the tank 110 is more than about 24 inches in length (as measured from the first end 111 to the second end 112).

As used herein, the term "about" refers to plus or minus 10% of the referenced number. For example, an embodiment wherein the tank 110 is about 10 inches in length includes a tank 110 that is between 9 and 11 inches in length.

The disclosures of the following U.S. patents are incorporated in their entirety by reference herein: U.S. Pat. No. 4,971,248; U.S. Pat. No. 5,150,840; U.S. Pat. No. 5,806,769; U.S. Pat. No. 7,207,503; U.S. Pat. No. 3,260,464; U.S. Design Pat. No. D355,019; U.S. Pat. No. 4,340,078.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

The reference numbers recited in the below claims are solely for ease of examination of this patent application, and are exemplary, and are not intended in any way to limit the scope of the claims to the particular features having the corresponding reference numbers in the drawings.

What is claimed is:

1. An underground sprinkler system (100) consisting of:
   (a) a ground surface (105);
   (b) a tank (110) having a first end (111), a second end (112), and an inner cavity (113) adapted to hold chemicals, wherein the tank (110) is disposed under the ground surface (105);
   (c) a distribution pipe (150) fluidly connected to the inner cavity (113) of the tank (110), the distribution pipe (150) allows chemicals to be added to the inner cavity (113) of the tank (110), wherein the distribution pipe (150) has a first end (152) disposed above the ground surface for chemical receiving and a second end (154) connected to the tank (110);
   (d) a mixer connector pipe (130) fluidly connected to the inner cavity (113) of the tank (110) and to a water source hose (101);

(e) a pump (140) disposed in the tank (110), the pump (140) functions to pump the chemicals out of the inner cavity (113) of the tank (110) and into the water source hose (101) via the mixer connector pipe (130); and (f) a secondary connector pipe (120) fluidly connected to the inner cavity (113) of the tank (110) and to the water source hose (101), the secondary connector pipe (120) allows water from the water source hose (101) to enter into the inner cavity (113) of the tank (110); and (g) a sprinkler (170) fluidly connected to the connector pipe (120), wherein the sprinkler (170) is disposed above the ground surface (105) for water dispersing.

\* \* \* \* \*